United States Patent
Kwon et al.

(10) Patent No.: US 9,756,344 B2
(45) Date of Patent: Sep. 5, 2017

(54) INTRA REFRESH METHOD FOR VIDEO ENCODING AND A VIDEO ENCODER FOR PERFORMING THE SAME

(71) Applicant: SAMSUNG ELECTRONICS CO., LTD., Suwon-si, Gyeonggi-do (KR)

(72) Inventors: Nyeong-Kyu Kwon, Daejeon (KR); Yo-Won Jeong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 470 days.

(21) Appl. No.: 14/328,184

(22) Filed: Jul. 10, 2014

(65) Prior Publication Data

US 2015/0049801 A1    Feb. 19, 2015

(30) Foreign Application Priority Data

Aug. 16, 2013 (KR) ........................ 10-2013-0097321

(51) Int. Cl.
| | |
|---|---|
| *H04N 19/196* | (2014.01) |
| *H04N 19/176* | (2014.01) |
| *H04N 19/119* | (2014.01) |
| *H04N 19/15* | (2014.01) |
| *H04N 19/107* | (2014.01) |

(52) U.S. Cl.
CPC ......... *H04N 19/176* (2014.11); *H04N 19/107* (2014.11); *H04N 19/119* (2014.11); *H04N 19/15* (2014.11); *H04N 19/196* (2014.11)

(58) Field of Classification Search
CPC ........................ H04N 19/176; H04N 19/00024
See application file for complete search history.

(56) References Cited

U.S. PATENT DOCUMENTS

| | | | |
|---|---|---|---|
| 7,974,479 B2 | 7/2011 | Tsukuda et al. | |
| 8,228,989 B2 | 7/2012 | Kim et al. | |
| 8,238,427 B2 | 8/2012 | Nagori | |
| 8,254,456 B2 | 8/2012 | Lee et al. | |
| 2003/0016754 A1* | 1/2003 | Gandhi ................... | H04N 19/61 375/240.24 |
| 2008/0175317 A1 | 7/2008 | Han et al. | |
| 2010/0128788 A1* | 5/2010 | Moccagatta ......... | H04N 19/176 375/240.15 |
| 2010/0128995 A1 | 5/2010 | Drugeon et al. | |
| 2010/0166075 A1 | 7/2010 | Lee et al. | |
| 2012/0099645 A1* | 4/2012 | Bekiares ............ | H04N 21/4325 375/240.12 |
| 2012/0106636 A1 | 5/2012 | Kim et al. | |

(Continued)

FOREIGN PATENT DOCUMENTS

| | | |
|---|---|---|
| KR | 1020030073268 | 9/2003 |
| KR | 1020040106409 | 12/2004 |
| KR | 1020110036520 | 4/2011 |

*Primary Examiner* — Tung Vo
*Assistant Examiner* — Rowina Cattungal
(74) *Attorney, Agent, or Firm* — F. Chau & Associates, LLC

(57) ABSTRACT

An intra refresh method is provided. The intra refresh method includes dividing a first frame into regions, counting a number of intra macroblocks included in each of the regions, calculating weight values of the regions, configuring a macroblock included in a second region of a second frame as an intra macroblock, based on the number of the first region. The second region corresponds to the first region.

20 Claims, 16 Drawing Sheets

(56) References Cited

U.S. PATENT DOCUMENTS

2013/0101039 A1* 4/2013 Florencio ............. H04N 19/176
375/240.16
2014/0219349 A1* 8/2014 Chien .................. H04N 19/105
375/240.12

* cited by examiner

INTRA REFRESH METHOD FOR VIDEO ENCODING AND A VIDEO ENCODER FOR PERFORMING THE SAME

CROSS-REFERENCE TO RELATED PATENT APPLICATION

This application claims priority under 35 U.S.C. §119 to Korean Patent Application No. 10-2013-0097321, filed on Aug. 16, 2013 in the Korean Intellectual Property Office, the disclosure of which is incorporated by reference herein in its entirety.

TECHNICAL FIELD

The present inventive concept relates to a video encoding method and a video encoder, and more particularly, to an intra refresh method for video encoding and a video encoder for performing the same.

DISCUSSION OF THE RELATED ART

A video encoder used for compressing a high-capacity video signal may adopt a prediction method. The video signal may include a plurality of frames arranged at uniform time intervals and may be encoded in units of frames. Each of the video encoder and a video decoder may include a processor for executing software and/or digital hardware including one or more logic circuits.

The encoded bit stream output by the video encoder may be transmitted to the video decoder through a channel. For example, the channel may be a communication network or a storage device, and may generate an error in the encoded bit stream. The video encoder and the video decoder may perform operations for reducing an influence of the error generated by the channel.

SUMMARY

According to an exemplary embodiment of the present inventive concept, an intra refresh method is provided. The intra refresh method includes dividing a first frame into a plurality of regions, counting a number of intra macroblocks included in each of the plurality of regions, calculating a weight value of a first region among the plurality of regions based on the number of intra macroblocks included in at least one of the plurality of regions, and configuring a macroblock included in a second region of a second frame as an intra macroblock, based on the weight value of the first region. The second region corresponds to the first region.

According to an exemplary embodiment of the present inventive concept, the first frame may be divided by repetitive quadtree division such that the first region corresponds to one of nodes of a quadtree of the first frame.

According to an exemplary embodiment of the present inventive concept, the first region may be divided into sub-regions in accordance with the weight value of the first region.

According to an exemplary embodiment of the present inventive concept, the weight value of the first region may be determined by the following equation:

$$Wc1 = \{1 - C1/(C1+C2+C3+\ldots+Cn)\}/(n-1),$$

where '$Wc1$' may be the weight value of the first region, '$C1$' may be a number of intra macroblocks included in the first region, '$n$' may be a number of the plurality of regions, and each of '$C2$', '$C3$,' and '$Cn$' may be a number of intra mactroblocks included a corresponding one among the plurality of regions excluding the first region.

According to an exemplary embodiment of the present inventive concept, the intra refresh method may further include storing the weight value of the first region in a weight value storage unit included in a video encoder as a quadtree data structure.

According to an exemplary embodiment of the present inventive concept, the intra refresh method may further include generating a random number and generating a threshold value based on the weight value of the first region and macroblocks included in the second region may be configured as intra macroblocks based on with a result of comparing the threshold value and the random number.

According to an exemplary embodiment of the present inventive concept, the threshold value may be determined based on the weight value of the first region, a predetermined number of intra macroblocks in the second frame, and a range of the random number.

According to an exemplary embodiment of the present inventive concept, the macroblocks included in the second region may be configured as intra macroblocks when the random number is smaller than the generated threshold value.

According to an exemplary embodiment of the present inventive concept, a size and a position of the first region may be equal to a size and a position of the second region.

According to an exemplary embodiment of the present inventive concept, the second frame may be a next frame of the first frame.

According to an exemplary embodiment of the present inventive concept, the intra refresh method may further include determining whether the second frame is a starting frame, and the weight value of the first region may be determined to be in proportion to a size of the first region when the second frame is determined as the starting frame.

According to an exemplary embodiment of the present inventive concept, each region in the plurality of regions may be equal in size.

According to an aspect of the present inventive concept, an intra refresh method is provided. The intra refresh method includes dividing a first frame into a plurality of regions, counting a number of intra macroblocks included in each of the plurality of regions, calculating a weight value of a first region among the plurality of regions based on the number of intra macroblocks included in at least one of the plurality of regions, calculating a number of intra macroblocks to be included in a second region of a second frame based on the weight value of the first region, and configuring macroblocks which are included in the second region as intra macroblocks, based on the calculated number of intra macroblocks to be included in the second region. The second region corresponds to the first region.

According to an exemplary embodiment of the present inventive concept, the configuring of the macroblocks may include estimating compression ratios when the macroblocks are configured as inter macroblocks and when the macroblocks are configured as intra macroblocks and configuring the macroblocks as the intra macroblocks based on the number of intra macroblocks to be included in the second region and a result of comparing a difference value between the estimated compression ratios with a reference value.

According to an exemplary embodiment of the present inventive concept, the intra refresh method may further include configuring the reference value based on a signal received from outside of a video encoder.

According to an exemplary embodiment of the present inventive concept, a mode decision unit is provided. The mode decision unit includes a macroblock counting unit and a decision unit. The macroblock counting unit is configured to count a number of intra macroblocks in a first region among a plurality of regions divided from a first frame. The decision unit is configured to determine whether to configure a macroblock included in a second region of a second frame as an intra macroblock, based on the weight value of the first region. The second region corresponds to the first region. The weight value may be calculated based on the counted number.

According to an exemplary embodiment of the present inventive concept, the mode decision unit may further include a weight value calculating unit and a weight value storage unit. The weight value calculating unit may be configured to receive the counted number output from the macroblock counting unit and to generate the weight value of the first region. The weight value storage unit may be configured to store the weight value.

According to an exemplary embodiment of the present inventive concept, the macroblock counting unit may determine whether to further divide the first region based on the weight value received from the weight value storage unit.

According to an exemplary embodiment of the present inventive concept, the decision unit includes a random number generator, a threshold value generator, and a comparator. The random number generator may be configured to generate a random number within a range. The threshold value generator may be configured to generate a threshold value based on the weight value. The comparator may be configured to compare the threshold value and the random number and to output a selection signal based on the compared result between the threshold value and the random number.

According to an exemplary embodiment of the present inventive concept, the threshold value may be determined based on the weight value, a predetermined number of intra macroblocks in the second frame, and the range of the random number.

According to an exemplary embodiment of the present inventive concept, the number of intra macroblocks in the first region may be inversely proportional to a number of intra macroblocks to be configured in the second region.

BRIEF DESCRIPTION OF THE DRAWINGS

Exemplary embodiments of the present inventive concept will be more clearly understood from the following detailed description taken in conjunction with the accompanying drawings in which.

DETAILED DESCRIPTION OF THE EMBODIMENTS

Figure 1:
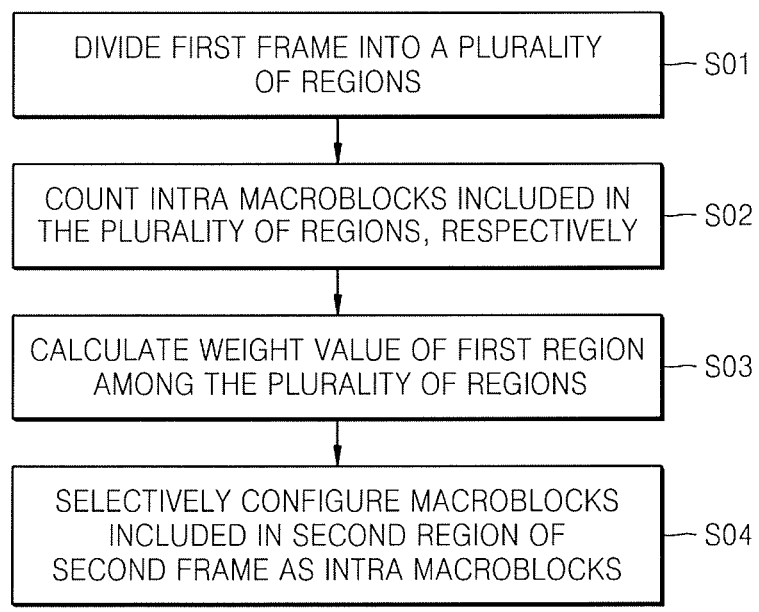
FIG. 1 is a flowchart illustrating an intra refresh method performed by a video encoder according to an exemplary embodiment of the present inventive concept.

The present invention now will be described more fully with reference to the accompanying drawings, in which exemplary embodiments of the present inventive concept are shown. This invention may, however, be embodied in many different forms and should not be construed as being limited to the embodiments set forth herein. In the drawings, the thickness of layers and regions may be exaggerated for clarity. The same reference numerals may refer to the same elements throughout the specification and drawings, and their description may be omitted.

A singular expression includes a plural expression unless explicitly described to the contrary.

Unless explicitly described to the contrary, all the terms used herein including technological or scientific terms have the same meanings as commonly understood to those skilled in the art. The terms commonly used and defined in the dictionary are to be interpreted as having the same meanings as contextual meanings.

FIG. 1 is a flowchart illustrating an intra refresh method performed by a video encoder according to an exemplary embodiment of the present inventive concept. As illustrated in FIG. 1, the intra refresh method according to the exemplary embodiment of the present inventive concept may include dividing a first frame into a plurality of regions in operation S01. The first frame may be one of a plurality of frames received by the video encoder. A first region that is one of the plurality of regions may include at least one macroblock. The macroblock may be configured either in an intra mode or an inter mode. The intra refresh method according to the present exemplary embodiment may include counting the number of macroblocks that are configured in the intra mode among the macroblocks included in the first region in operation S02. Hereinafter, the macroblocks configured in the intra mode are referred to as 'intra macroblocks' and macroblocks configured in the inter mode are referred to as 'inter macroblocks'. The intra mode and the inter mode will be described in detail later.

In addition, the intra refresh method according to the present exemplary embodiment may include calculating a weight value of the first region based on the number of intra macroblocks among the macroblocks included in the first region in operation S03 and selectively configuring macroblocks included in a second region of a second frame as the intra macroblocks based on the weight value of the first region in operation S04. According to the exemplary embodiment of the present inventive concept, a size and a position of the first region in the first frame may be equal to those of the second region in the second frame.

Figure 2:
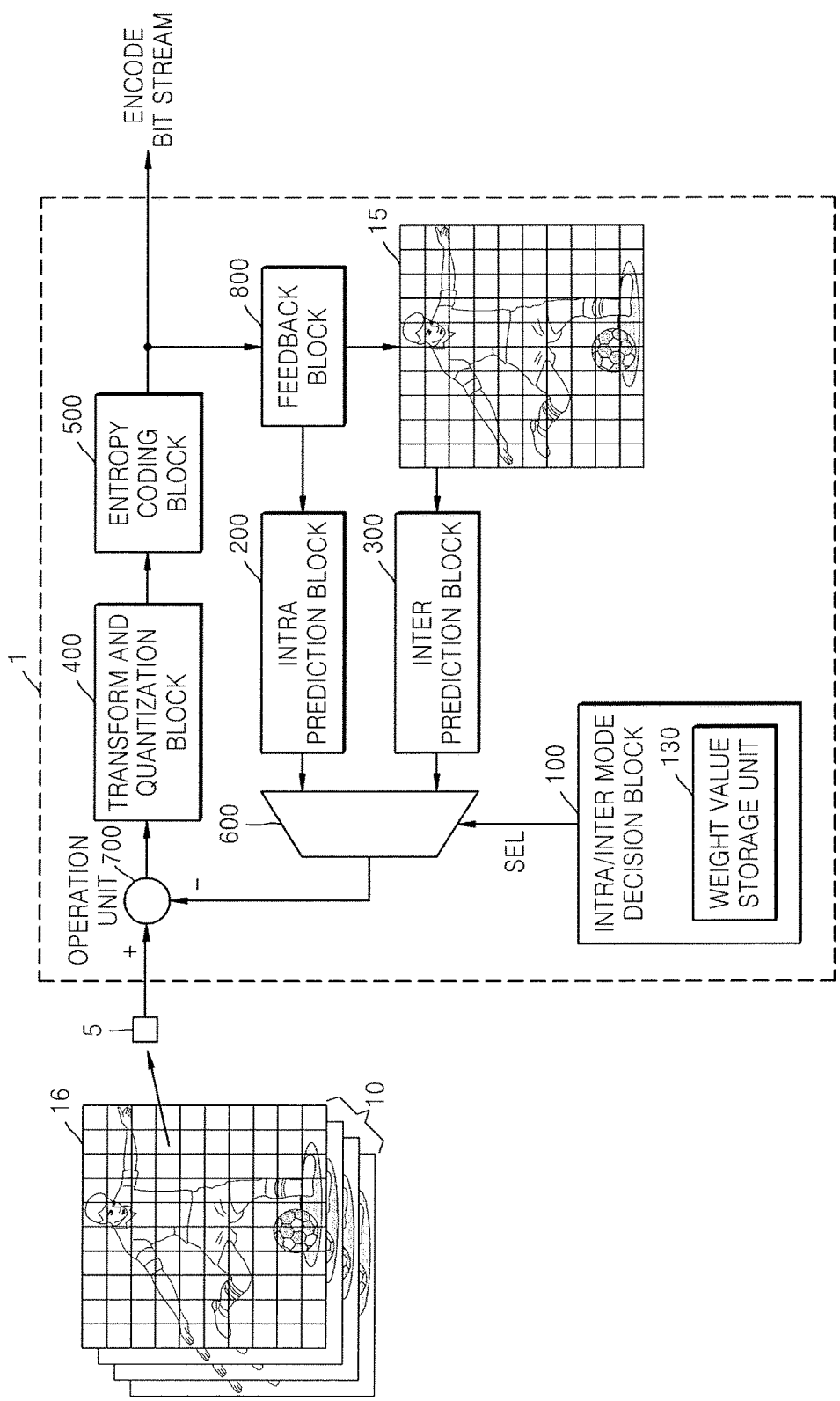
FIG. 2 is a block diagram illustrating an operation of video encoding according to an exemplary embodiment of the present inventive concept.

FIG. 2 is a block diagram illustrating a video encoder and an operation of the video encoder according to an exemplary embodiment of the present inventive concept. As illustrated in FIG. 2, a video encoder 1 may include an intra/inter mode decision block 100, an intra prediction block 200, an inter prediction block 300, a transform and quantization block 400, and an entropy coding block 500. In addition, as illustrated in FIG. 2, the video encoder 1 may further include a selection block 600, an operation unit 700, and a feedback block 800. The video encoder 1 and the respective elements included in the video encoder 1 may correspond to software executed by a processor or digital hardware including one or more logic circuits.

The video encoder 1 that performs video encoding may receive a video signal and may output an encoded bit stream. A video decoder may receive the encoded bit stream through a channel and may decode the encoded bit stream to restore the video signal. The video signal may include a frame sequence 10. The frame sequence 10 may include a plurality of frames arranged in a timing order in which moving images are generated. A frame may represent a visual scene at a specific point in time.

The frames included in the frame sequence 10 may be divided into intra frames and inter frames. The intra frames may be independently decoded without referring to other frames. On the other hand, the inter frames are encoded with reference to previous frames and/or subsequent frames. The intra frames consume a relatively large number of bits and the inter frames may be relatively sensitive to errors.

The video encoder 1 may perform encoding in units of frames. For example, FIG. 2 illustrates the video encoder 1 that receives a second frame 16 included in the frame sequence 10. The second frame 16 may include pixels as the smallest units that represent an image. A pixel stores one color. Through a plurality of pixels, a frame may represent a visual scene.

To compress the video signal, differential encoding may be used. For example, one frame (e.g., a current frame) included in the frame sequence 10 may be compared with another frame (e.g., a reference frame), and thus, a difference between the one frame and the other frame may be encoded. As the number of pixels that match between the current frame and the reference frame increases, the number of data which corresponds to pixels and is required for performing encoding may be reduced. When a video signal includes a quickly moving image, compression efficiency of the video signal through differential encoding may be reduced.

The video encoder 1 may use a motion compensation technique. The motion compensation technique may be performed by using unit blocks having a uniform size. The unit blocks are referred to as 'macroblocks'. Each of the macroblocks may include a plurality of pixels. For example, FIG. 2 illustrates that the second frame 16 of the video signal includes a plurality of macroblocks. As illustrated in FIG. 2, a macroblock 5 included in the second frame 16 may be input to the video encoder 1.

In accordance with the motion compensation technique, the video encoder 1 may compare macroblocks belonging to the current frame to macroblocks belonging to the reference frame and may determine macroblocks that match between the current frame and the reference frame. When a macroblock belonging to the current frame and a macroblock belonging to the reference frame are found to be the same as or similar to each other, encoding may be performed based on relative locations of two macroblocks in each of the current frame and reference frame. A difference in location between the two macroblocks is referred to as a 'motion vector'. The video encoder 1 may encode the motion vector and the difference in location between the two macroblocks. Thus, the amount of data required for encoding the macroblocks belonging to the current frame may be reduced.

The frames included in the frame sequence 10 may be either the intra frames or the inter frames. The intra frames may be independently decoded without reference frames. On the other hand, the inter frames are encoded with reference to at least one reference frame, for example, through the motion compensation technique. The intra frames may reduce loss that occurs due to encoding, but may also consume a larger number of encoded bits than the inter frames. The frame sequence 10 may consist of the intra frames arranged at uniform intervals and the inter frames arranged between the intra frames.

The channel through which the encoded bit stream passes may generate an error. To reduce an influence of the error generated by the channel, the inter frames may include at least one macroblock configured in an intra mode (e.g., intra macroblock). Configuring parts of the macroblocks included in each inter frame as the intra macroblocks is referred to as 'infra refresh'. For example, randomly selecting a macroblock to be configured as an intra macroblock is referred to as 'random intra refresh'. In the intra macroblocks configured by the intra refresh, a difference value between neighboring macroblocks may be encoded without using the motion compensation technique. Thus, the intra macroblocks may consume a larger number of encoded bits than the other macroblocks (e.g., inter macroblocks).

As the number of intra macroblocks configured by the intra refresh is increased, a probability of correcting the error may be increased and compression efficiency may deteriorate. In addition, when the intra macroblocks configured by the intra refresh are concentrated in a specific position of a frame, the probability of correcting the randomly generated error may be reduced. Thus, a proper number of intra macroblocks for compression efficiency may be uniformly configured in the frame to correct the randomly generated error. The intra refresh may be performed by the intra/inter mode decision block 100 included in the video encoder 1, which will be described hereinafter.

As illustrated in FIG. 2, the video encoder 1 may include the intra prediction block 200 and the inter prediction block 300. For intra prediction of macroblocks, the intra prediction block 200 may output a neighboring macroblock of a macroblock 5 input to the video encoder 1 based on data received from the feedback block 800. Thus, the macroblock 5 may be encoded based on a difference value between the macroblock 5 and the neighboring macroblock. The inter prediction block 300 may generate a motion vector in accordance with the above-described motion compensation technique with reference to a first frame 15 generated based on the data output from the feedback block 800 and may output a macroblock in accordance with the motion vector.

The feedback block 800 may generate data required by the intra prediction block 200 and the inter prediction block 300 based on an output signal of the entropy coding block 500. For example, the feedback block 800 may include a reverse quantization and transform block, an adder, and a deblocking filter. As illustrated in FIG. 2, the first frame 15 may be generated based on the data output from the feedback block 800 and the generated first frame 15 may be used for inter prediction of the macroblocks included in the second frame 16. The generated first frame 15 may be stored in a buffer. According to the exemplary embodiment of the present inventive concept, the first frame 15 may be a previous frame of the second frame 16 in a timing order in which moving images are generated.

The macroblocks output from the intra prediction block 200 and the inter prediction block 300 may be selectively transmitted to the operation unit 700 through the selection block 600 based on the selection signal SEL. For example, the intra/inter mode decision block 100 may control the selection block 600 through the selection signal SEL. The selection block 600 may transmit one of the macroblocks output from the intra prediction block 200 and the inter prediction block 300 to the operation unit 700 in accordance with the selection signal SEL. FIG. 2 illustrates that the intra/inter mode decision block 100 controls the selection block 600 through the selection signal SEL to select a macroblock to be output. However, it is only an exemplary embodiment of the present inventive concept. For example, a macroblock to be output may be selected by a conditional sentence included in software.

According to the exemplary embodiment of the present inventive concept, the intra/inter mode decision block 100 may include a weight value storage unit 130. The intra/inter mode decision block 100 may determine whether to configure the macroblock 5 input to the video encoder 1 in the intra mode or in the inter mode. For example, the intra/inter mode decision block 100 may determine the macroblock 5 to be in the intra mode (e.g., configure the macroblock 5 as an intra macroblock) based on a weight value stored in the weight value storage unit 130. Configuring the macroblock 5 as an intra macroblock using a calculated the weight value will be described in detail later.

The operation unit 700 may output a difference value between the macroblock 5 input to the video encoder 1 and the macroblock received from the selection block 600. The transform and quantization block 400 may receive the difference value from the operation unit 700, may remove a high frequency component of the difference value, and may output quantized data in which spatial overlap is reduced. The entropy coding block 500 may receive the quantized data from the transform and quantization block 400, may perform entropy (statistical) encoding on the quantized data to reduce overlap of codes, and may output an encoded bit stream to the outside of the video encoder 1.

Figure 3:
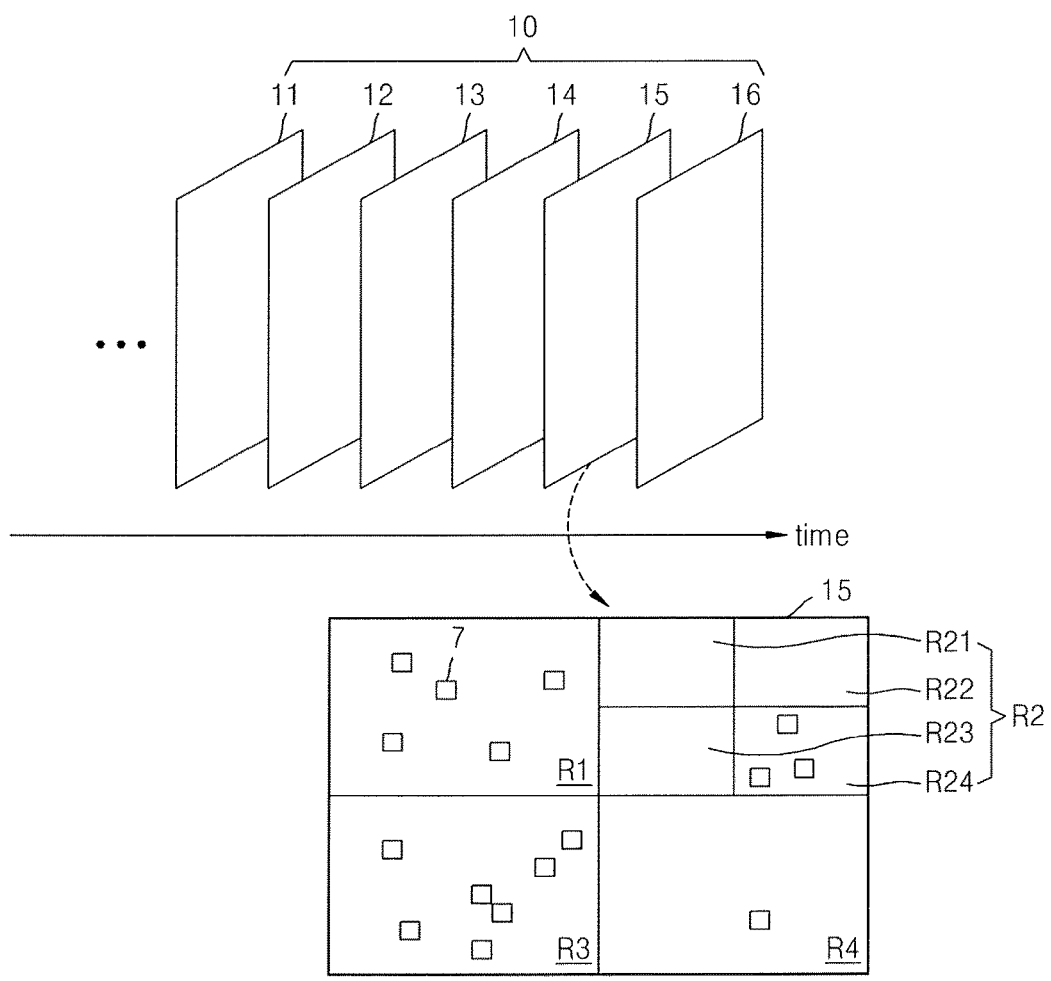
FIG. 3 is a view illustrating a frame divided into a plurality of regions according to an exemplary embodiment of the present inventive concept.

FIG. 3 is a view illustrating a frame divided into a plurality of regions according to an exemplary embodiment of the present inventive concept. As illustrated in FIG. 3, the frame sequence 10 may include a plurality of frames 11 to 16 arranged in a timing order in which moving images are generated. In addition, the first frame 15 divided into a plurality of regions R1 to R4 and R21 to R24 is illustrated in the lower half of FIG. 3. FIG. 3 illustrates an example in which the first frame 15 is a previous frame of the second frame 16.

According to an exemplary embodiment of the present inventive concept, when the intra refresh is performed on the second frame 16 including a macroblock currently input to the video encoder 1, a result of performing the intra refresh on the first frame 15 may be used. As illustrated in FIG. 3, the first frame 15 may be divided into the plurality of regions R1 to R4, and the number of intra macroblocks 7 included in each of the regions may be counted. For example, the region R1 may include five intra macroblocks 7, the region R2 may include three intra macroblocks 7, the region R3 may include seven intra macroblocks 7, and the region R4 may include one intra macroblock 7. In addition, the region R2 may be further divided into the four sub-regions R21 to R24, and the region R24 may include all three intra macroblocks 7 included in the region R2. FIG. 3 illustrates that the second frame 16 is a next frame of the first frame 15. However, the present invention is not limited to the above.

The intra/inter mode decision block 100 may perform the intra refresh on the second frame 16 in accordance with the number of intra macroblocks 7 included in each of the regions R1 to R4 and R21 to R24 of the first frame 15. For example, the intra/inter mode decision block 100 may configure a relatively small number of intra macroblocks 7 in a region of the second frame 16 that corresponds to the region R1 of the first frame 15 including the largest number of intra macroblocks 7 among the regions R1 to R4. The intra/inter mode decision block 100 may configure a relatively large number of intra macroblocks 7 in a region of the second frame 16 that corresponds to the region R4 of the first frame including the smallest number of intra macroblocks 7 among the regions R1 to R4. For this purpose, the intra/inter mode decision block 100 may calculate weight values of the respective regions R1 to R4 of the first frame and may perform the intra refresh on the second frame 16 based on the calculated weight values. Thus, the intra macroblocks configured by the intra refresh may be uniformly distributed through regions of the second frame 16.

Figure 4:
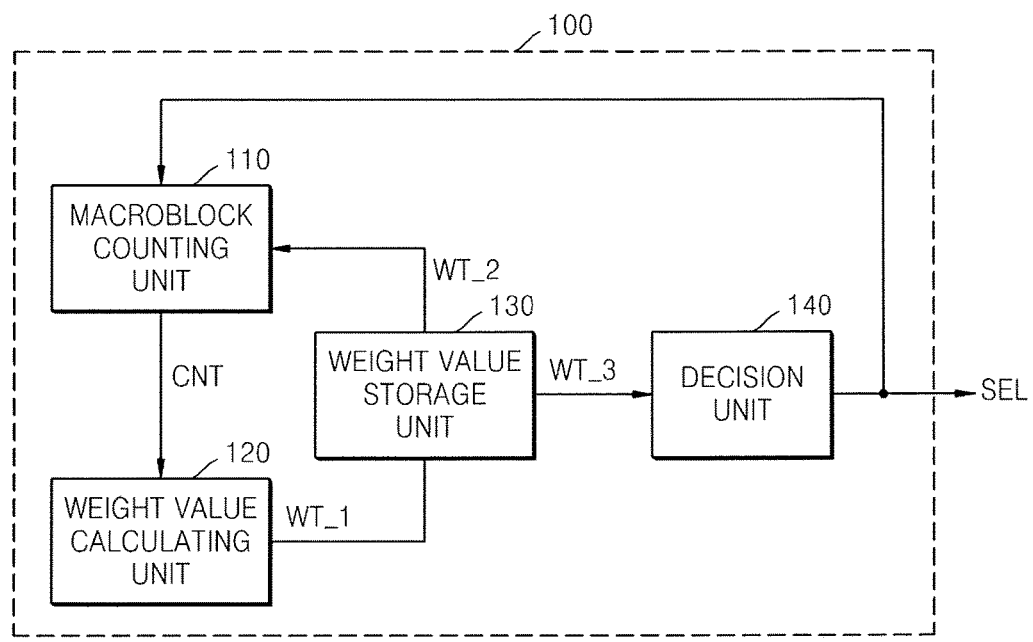
FIG. 4 is a block diagram illustrating an implementation example of an intra/inter mode decision block according to an exemplary embodiment of the present inventive concept.

FIG. 4 is a block diagram illustrating an implementation example of an intra/inter mode decision block 100 according to an exemplary embodiment of the present inventive concept. As illustrated in FIG. 4, the intra/inter mode decision block 100 may include a macroblock counting unit 110, a weight value calculating unit 120, a weight value storage unit 130, and a decision unit 140. As illustrated in FIG. 2, the intra/inter mode decision block 100 may configure the macroblock 5 currently input to the video encoder 1 either in the intra mode or in the inter mode through the selection signal SEL.

The macroblock counting unit 110 may receive the selection signal SEL output by the decision unit 140. The macroblock counting unit 110 may count the number of intra macroblocks based on the selection signal SEL and may output a number signal CNT in accordance with the counted number. The number signal CNT output from the macroblock counting unit 110 may represent the number of intra macroblocks included in the first region that is one of the plurality of regions of the first frame 15. In addition, the macroblock counting unit 110 may receive a weight value WT_2 from the weight value storage unit 130 and may refer to the received weight value WT_2 to determine whether to divide the first frame 15 into the plurality of regions or whether to further divide each of the plurality of regions. An operation of the macroblock counting unit 110 will be described in detail with reference to FIG. 5.

The weight value calculating unit 120 may receive the number signal CNT of the macroblocks included in the first region from the macroblock counting unit 110, may generate a weight value WT_1 of the first region based on the number signal CNT, and may output the weight value WT_1. The weight value WT_1 of the first region may be stored in the weight value storage unit 130. The weight value storage unit 130 may store weight values corresponding to the plurality of regions including the first region of the first frame 15 and may output a weight value WT_2 or a weight value WT_3 of the stored weight values in response to an access request by the macroblock counting unit 110 or the decision unit 140, respectively.

The decision unit 140 may receive the weight value WT_3 from the weight value storage unit 130 and may determine whether to configure the macroblock 5 currently input to the video encoder 1 in the intra mode based on the received weight value WT_3. For example, the decision unit 140 may receive the weight value WT_3 of the first region included in the first frame 15 from the weight value storage unit 130. Here, the first region included in the first frame 15 may correspond to the second region of the second frame 16. An operation of the decision unit 140 may be described in detail with reference to FIGS. 10A and 10B.

Figure 5:
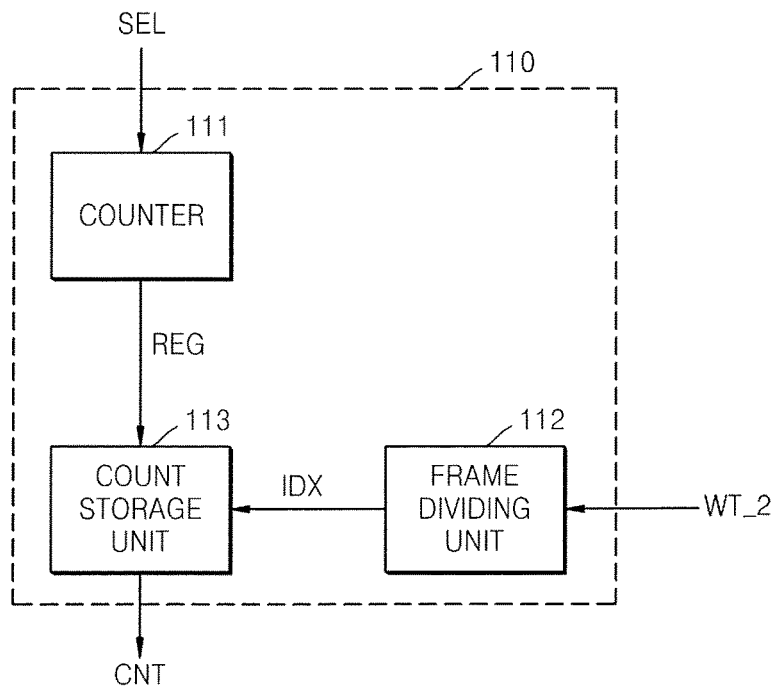
FIG. 5 is a block diagram illustrating an implementation example of a macroblock counting unit according to an exemplary embodiment of the present inventive concept.

FIG. 5 is a block diagram illustrating an implementation example of a macroblock counting unit 110 according to an exemplary embodiment of the present inventive concept. As illustrated in FIG. 5, the macroblock counting unit 110 may include a counter 111, a frame dividing unit 112, and a count storage unit 113. The counter 111 may count the number of macroblocks configured as intra macroblocks in accordance with the selection signal SEL and may output a signal REG in accordance with the counted number.

The frame dividing unit 112 may divide the first frame 15 into a plurality of regions. For example, the frame dividing unit 112 may divide the first frame 15 into the plurality of regions including the first region, based on the weight value WT_2 received from the weight value storage unit 130. In addition, the frame dividing unit 112 may output an index IDX of the first region of the first frame 15 corresponding to the second region of the second frame 16 including the macroblock 5 in accordance with a position of the macroblock 5 input to the video encoder 1. For example, the index IDX of the first region of the first frame 15 includes information on the second region of the second frame 16 including the macroblock 5.

The count storage unit 113 may output the number signal CNT corresponding to the number of intra macroblocks included in the first region based on the signal REG received from the counter 111 and the index IDX received from the frame dividing unit 112. For example, the count storage unit 113 may accumulate numbers corresponding to the signals REG received from the counter 111, based on the index IDX of the first region and may output the number signal CNT that corresponds to the number of intra macroblocks included in the first region.

Figure 6A:
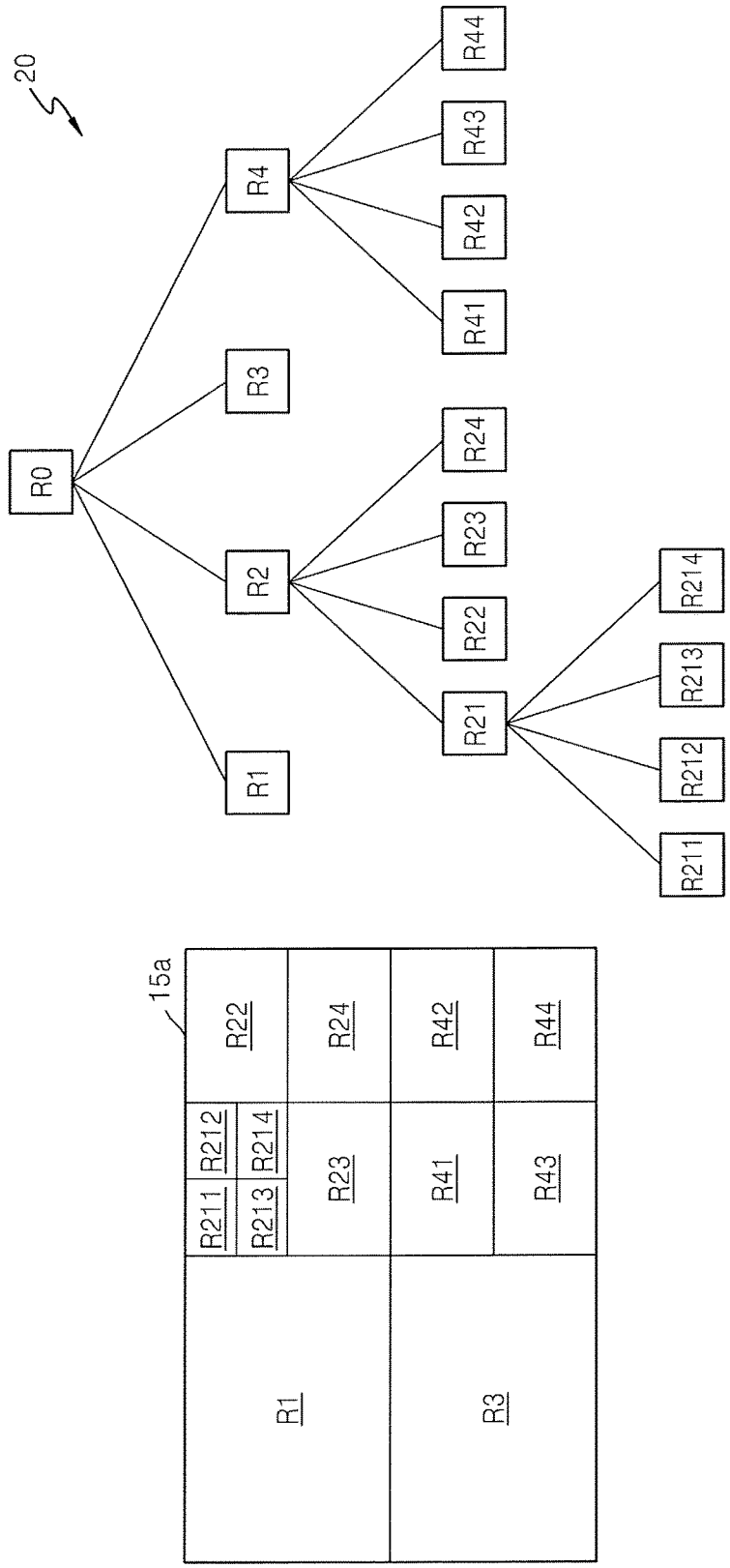
FIGS. 6A and 6B illustrate examples of a first frame divided by a frame dividing unit according to an exemplary embodiment of the present inventive concept.
Figure 6B:
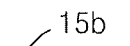

FIGS. 6A and 6B illustrate examples of a first frame divided by a frame dividing unit 112 according to an exemplary embodiment of the present inventive concept. According to the exemplary embodiment of the present inventive concept, the frame dividing unit 112 may divide the first frame 15*a* into the plurality of regions including the first region. The first region of the first frame 15*a* may correspond to the second region of the second frame 16. For example, a position and a size of the second region may be equal to those of the first region.

FIG. 6A is a view illustrating a first frame 15*a* divided into a plurality of regions according to an exemplary embodiment of the present inventive concept. According to the exemplary embodiment of the present inventive concept, the first frame 15*a* may be divided by repetitive quadtree division. A quadtree used for the quadtree division may be defined as a tree data structure in which a parent node has four child nodes. The quadtree division may be defined as a repetitive division of a two-dimensional space into four quadrants having the same size. The depth of the quadtree may be defined by the maximum number of edges that exist from a root node (e.g., a node that does not have a parent node) to a leaf node (e.g., a node that does not have a child node). For example, a quadtree in which only the root node exists may be defined as having a depth of zero. For example, a quadtree having a depth D may be used for dividing a frame including $2^D \times 2^D$ pixels. According to the exemplary embodiment of the present inventive concept, the quadtree used for dividing the first frame 15*a* may have the maximum depth when a leaf node corresponds to a macroblock.

According to the exemplary embodiment of the present inventive concept, a quadtree 20 may be used for dividing the first frame 15*a*. As illustrated on the left of FIG. 6A, the first frame 15*a* divided into a plurality of regions may be expressed as the quadtree 20 illustrated on the right of FIG. 6A. For example, a root node of the quadtree 20 may represent the first frame 15*a* and child nodes of the root node may correspond to regions R1 to R4 which are quadrants of the first frame 15*a*, respectively. An arbitrary quadrant may be divided into four lower quadrants having the same size. For example, the region R2 that is a quadrant of the first frame 15*a* (e.g., root node or region R0) may be divided into four quadrants R21 to R24 and the region R4 that is a quadrant of the first frame 15*a* (e.g., root node or region R0) may be divided into four quadrants R41 to R44. For example, the region R21 that is a quadrant of the region R21 may be divided into four quadrants R211 to R214. Thus, a depth of the quadtree 20 illustrated in FIG. 6A is 3 and the first frame 15*a* may be divided into 13 regions R1, R3, R22 to R24, R41 to R44, and R211 to R214. Further, the number of regions (e.g., 13 in the example illustrated in FIG. 6A) is equal to the number of leaf nodes included in the quadtree 20.

FIG. 6B is a view illustrating a first frame 15*b* divided into a plurality of regions according to an exemplary embodiment of the present inventive concept. According to the exemplary embodiment of the present inventive concept, the first frame 15*b* may be divided into n regions having the same size. For example, as illustrated in FIG. 6B, the first frame 15*b* may be divided into 16 regions R01' to R16' having the same size.

Figure 7:
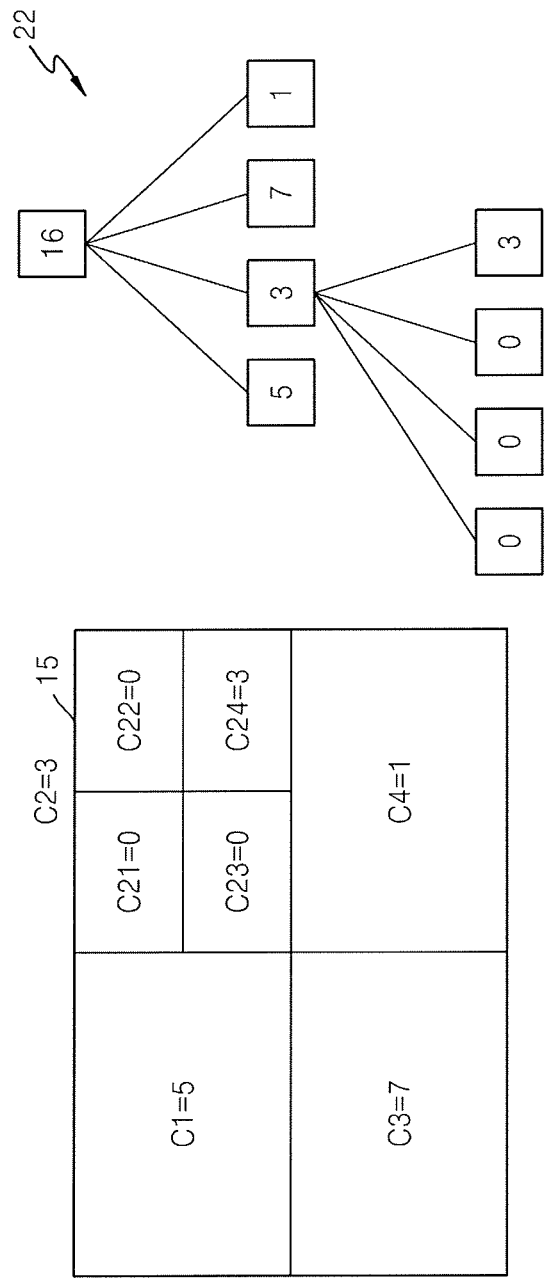
FIG. 7 is a view illustrating data stored by a count storage unit of a macroblock counting unit according to an exemplary embodiment of the present inventive concept.
Figure 8:
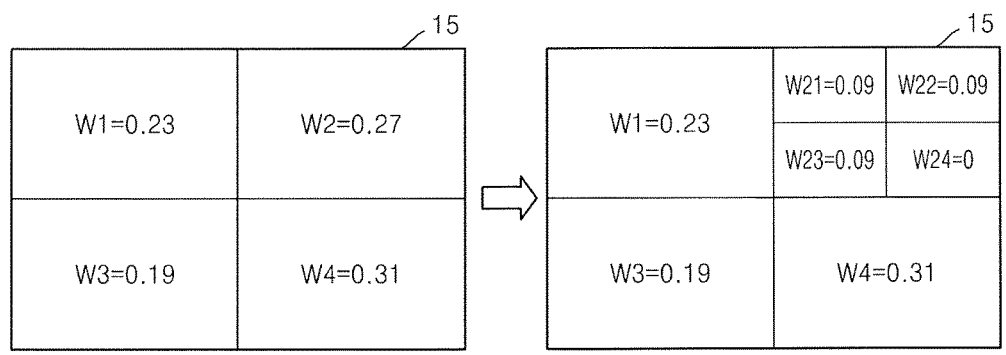
FIG. 8 is a view illustrating weight values calculated by a weight value calculating unit according to an exemplary embodiment of the present inventive concept.
Figure 9:
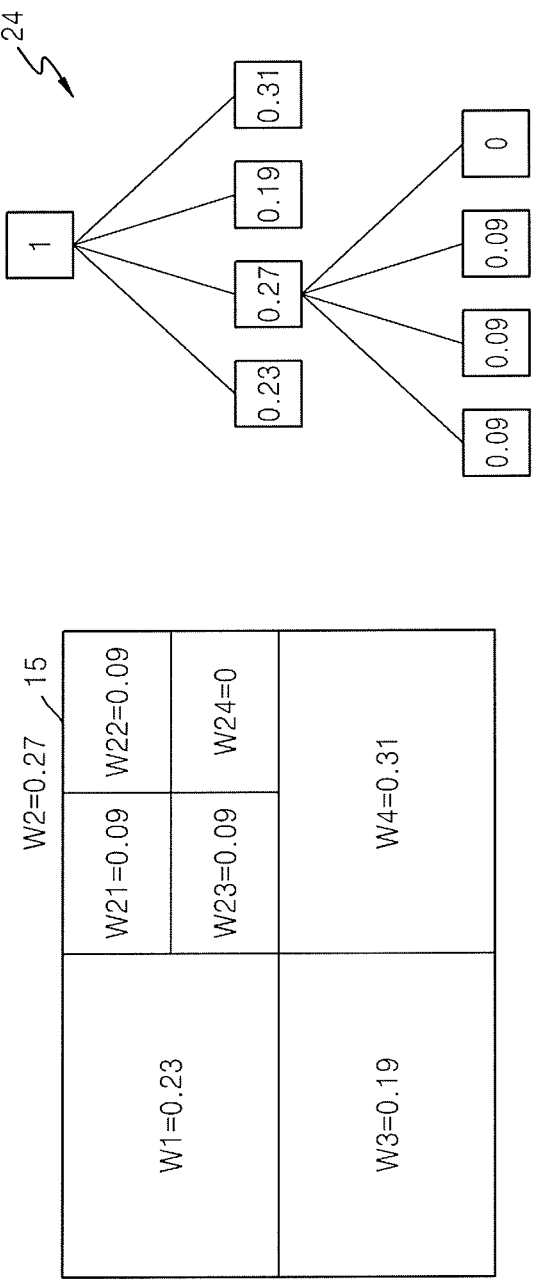
FIG. 9 is a view illustrating data stored by a weight value storage unit according to an exemplary embodiment of the present inventive concept.

FIGS. 7 to 9 illustrate exemplary embodiments of the present inventive concept with reference to the first frame 15, which includes the intra macroblocks 7, divided into the plurality of regions R1 to R4 and R21 to R24 as illustrated in FIG. 3. In addition, in FIGS. 7 to 9, it is assumed that the first frame 15 is divided into the plurality of regions R1 to R4 and R21 to R24 through quadtree division.

FIG. 7 is a view illustrating data stored in the count storage unit 113 of the macroblock counting unit 110 according to an exemplary embodiment of the present inventive concept. As illustrated in FIG. 5, the count storage unit 113 may output the number signal CNT in accordance with the number of intra macroblocks included in the first region of the first frame 15. The count storage unit 113 may store the number signal CNT to output the number signal CNT. For example, when the first frame 15 is divided into the plurality of regions, the count storage unit 113 may store the number of intra macroblocks included in each of the plurality of regions.

Referring to FIGS. 3 to 7, the count storage unit 113 may store the number values C1 to C4 and C21 to C24 using a quadtree 22 as a data structure. Each of the number values C1 to C4 and C21 to C24 may represent the number of intra macroblocks included in a corresponding one of the regions R1 to R4 and R21 to R24. For example, the count storage unit 113 may store sixteen (16) as a number value for the root node of the quadtree 22 when the number of intra macroblocks included in the first frame 15 is sixteen (16). In addition, the count storage unit 113 may store three (3) as a number value C2 that corresponds to the number of intra macroblocks included in the region R2. As illustrated in FIG. 7, sixteen (16), which is the sum of the numbers of intra macroblocks stored in leaf nodes of the quadtree 22, may be equal to the number of intra macroblocks included in the first frame 15, that is, sixteen (16) as stored in the root node of the quadtree 22.

FIG. 8 is a view illustrating weight values calculated by the weight value calculating unit 120 according to an exemplary embodiment of the present inventive concept. The weight value calculating unit 120 may calculate a weight value of the first region of the first frame 15 based on the number of intra macroblocks included in the first region. For example, as illustrated on the left of FIG. 8, when the first frame 15 is divided into four quadrants by the frame dividing unit 112 of the block counting unit 110 and the number values C1 to C4 are provided to the macroblock counting unit 110, the weight value calculating unit 120 may calculate weight values W1 to W4 for the regions R1 to R4 using EQUATION 1.

$$Wi = \{1 - Ci/(C1+C2+C3+C4)\}/3 \quad (1 \leq i \leq 4) \quad \text{[EQUATION 1]}$$

The weight values W1 to W4 calculated by EQUATION 1 are illustrated on the left of FIG. 8. The weight values W1 to W4 may increase as the number of intra macroblocks included in each of the regions of the first frame 15 decreases. For example, it may be noted from the weight values that the second region of the second frame 16 may include a relatively small number of intra macroblocks when the first region of the first frame 15 corresponding to the second region has a relatively large number of intra macroblocks, or vice versa. For example, referring back to the exemplary embodiment illustrated in FIG. 8, the decision unit 140 may configure a larger number of intra macroblocks in a region of the second frame 16 corresponding to the region R4 of the first frame 15 than a number of intra macroblocks in a region of the second frame 16 corresponding to the region R3 of the first frame 15.

The following EQUATION 2 may be applied to a parent node and child nodes of a quadtree. EQUATION 1 may correspond to the case when the parent node is the first frame 15 and a weight value (e.g., Wp) of the first frame 15 is 1 in EQUATION 2.

$$Wci = Wp \times \{1 - Ci/(C1+C2+C3+C4)\}/3 \quad (1 \leq i \leq 4) \quad \text{[EQUATION 2]}$$

where Wp represents a weight value of the parent node, C1 to C4 each represents the number of intra macroblocks included in each of the child nodes, and Wci ($1 \leq i \leq 4$) represent weight values of the four child nodes, respectively. Referring to FIGS. 3 to 8, weight values W21 to W24 of the sub-regions R21 to R24 of the region R2 may be calculated using EQUATION 2. As illustrated in FIG. 8, a weight value W2 (e.g., 0.27) of the region R2 may be equal to the sum of the weight values W21 to W24 of the sub-regions R21 to R24.

According to the exemplary embodiment of the present inventive concept, as illustrated in FIG. 6B, when the first frame 15 is divided into n regions R1' to Rn' having a uniform size, weight values W1' to Wn' of the regions R1' to Rn' may be calculated by the following EQUATION 3 based on the number values C1' to Cn', each of which represents the number of intra macroblocks included in each of the regions R1' to Rn'.

$$Wi' = \{1 - Ci'/(C1' + \ldots + Cn')\}/(n-1) \quad (1 \leq i \leq n) \quad \text{[EQUATION 3]}$$

According to the exemplary embodiment of the present inventive concept, when the second frame 16 is a starting frame, the frame dividing unit 112 may prepare a virtual first frame. For example, the frame sequence 10 may include inter frames and intra frames, and an immediate next inter frame of an intra frame may be a starting intra frame among a series of intra frames. The frame dividing unit 112 may divide the virtual first frame into a plurality of regions. The weight value calculating unit 120 may calculate weight values of each of the plurality of regions in proportion to sizes of the regions. For example, the frame dividing unit 112 may divide the virtual first frame into n regions having a uniform size as illustrated in the exemplary embodiment of FIG. 6B, and the weight value calculating unit 120 may output 1/n as weight values of the respective regions.

FIG. 9 is a view illustrating data stored in the weight value storage unit 130 according to an exemplary embodiment of the present inventive concept. The weight value storage unit 130 may store the weight values of the regions of the first frame 15. Referring to FIGS. 3 to 7, the weight value storage unit 130 may store the weight values W1 to W4 and W21 to W24 of the respective regions R1 to R4 to R21 to R24 using a quadtree 24 as a data structure. For example, the weight value storage unit 130 may store 1 as a weight value of the first frame 15 that corresponds to a root node of the quadtree 24. In addition, the weight value storage unit 130 may store 0.27 as a weight value W2 of the region R2 that corresponds to one of child nodes of the root node. As illustrated in FIG. 9, the sum of the weight values stored in leaf nodes of the quadtree 24 may be equal to the weight value of 1 of the first frame 15.

Figure 10A:
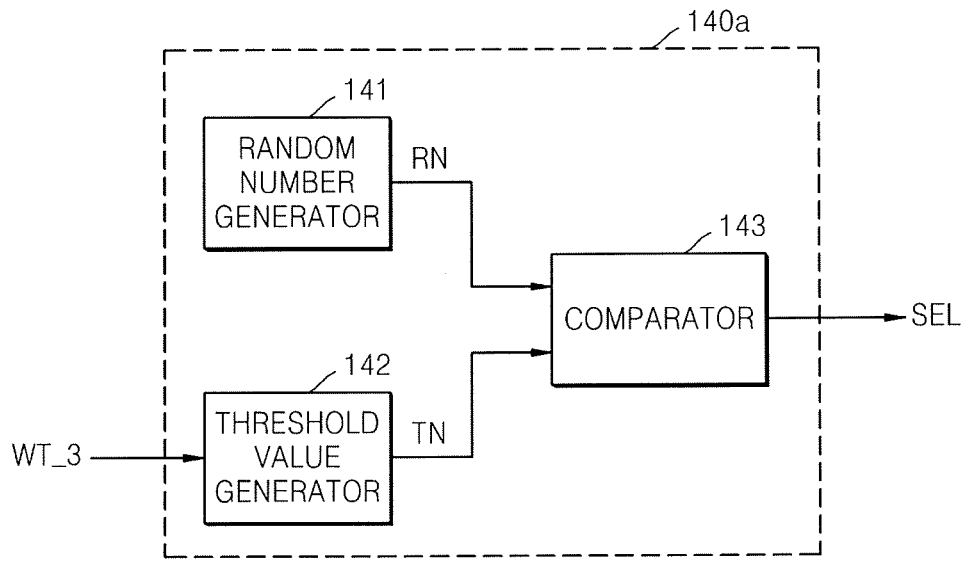
FIGS. 10A and 10B illustrate implementation examples of a decision unit according to exemplary embodiments of the present inventive concept.
Figure 10B:
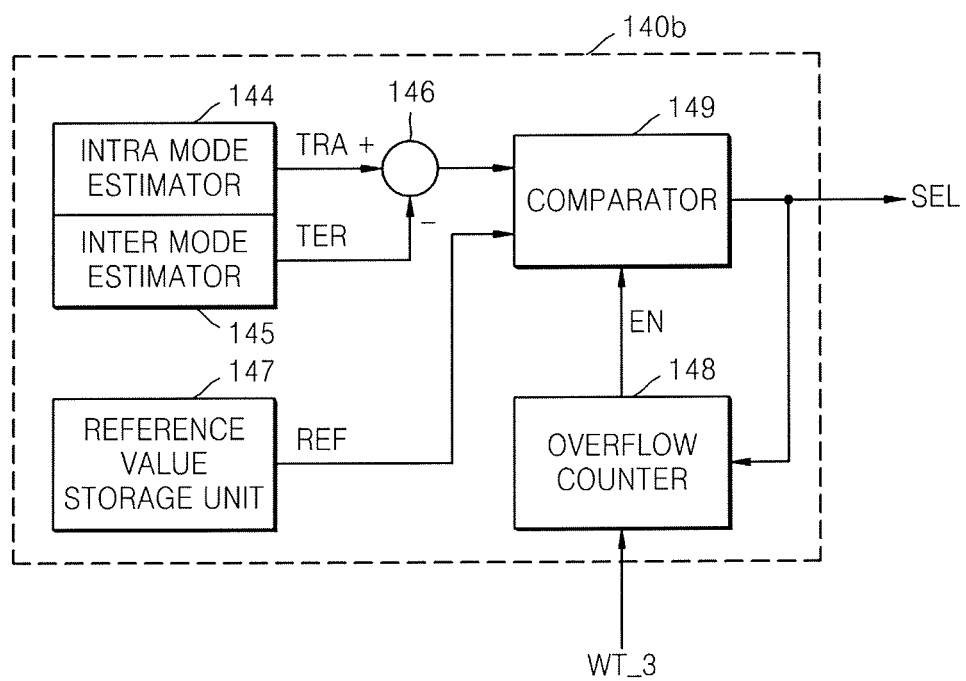

FIGS. 10A and 10B illustrate implementation examples of the decision unit 140 according to exemplary embodiments of the present inventive concept.

Decision units 140a and 140b illustrated, respectively in FIGS. 10A and 10B may each receive a weight value WT_3 from the weight value storage unit 130, may output the selection signal SEL obtained based on the received weight value WT_3, and may determine whether to configure the macroblock 5 currently input to the video encoder 1 as an intra macroblock.

In the exemplary embodiment illustrated in FIG. 10A, the decision unit 140a may include a random number generator 141, a threshold value generator 142, and a comparator 143. The random number generator 141 may generate a random number RN within a specific range RG having lower and upper limits. The threshold value generator 142 may generate a threshold value TN based on the weight value WT_3 received from the weight value storage unit 130. The weight value WT_3 received from the weight value storage unit 130 may be the weight value of the first region of the first frame 15 corresponding to the second region of the second frame 16 including the macroblock 5 currently input to the video encoder 1.

The comparator 143 may compare the threshold value TN with the random number RN generated by the random number generator 141. The threshold value TN may be used for controlling the number of intra macroblocks included in one region. For example, the video encoder 1 may store a predetermined number Cf of intra macroblocks to be included in one frame. The number Cf may be determined in accordance with a compression ratio or a desired error correction level of a video signal. The number of intra macroblocks included in the second frame 16 may be close to the number Cf of intra macroblocks to be included.

When the number of macroblocks included in a certain region is Cr, according to the exemplary embodiment of the present inventive concept, the threshold value generator 142 may generate the threshold value TN of the region using the following EQUATION 4.

$$TN=\{(Cf \times WT\_3)/Cr\} \times RG \qquad \text{[EQUATION 4]}$$

According to the exemplary embodiment of the present inventive concept, when the threshold value generator 142 generates the threshold value TN using EQUATION 4, the comparator 143 may output the selection signal SEL that configures the macroblock 5 as an intra macroblock when the random number RN is smaller than the threshold value TN. For example, the threshold value generator 142 may calculate the number (e.g., Cf×WT_3/Cr) of intra macroblocks to be included in one region of the second frame 16 and may generate the threshold value TN of the random number RN, and thus, the intra macroblocks may be randomly arranged in the region.

Referring to FIG. 10B, the decision unit 140b may include an intra mode estimator 144, an inter mode estimator 145, a subtractor 146, a reference value storage unit 147, an overflow counter 148, and a comparator 149. The intra mode estimator 144 and the inter mode estimator 145 may output signals TRA and TER, respectively, dependent on compression ratios of the macroblock 5 currently input to the video encoder 1. The compression ratios of the macroblock 5 may be obtained when the macroblock 5 is configured as the intra macroblock and the inter macroblock, respectively. For example, the intra mode estimator 144 may output the number of bits consumed when the macroblock 5 is encoded in accordance with the intra mode (e.g., when the macroblock 5 is configured as an intra macroblock). In addition, the inter mode estimator 145 may output the number of bits consumed when the macroblock 5 is encoded in accordance with the inter mode (e.g., when the macroblock 5 is configured as an inter macroblock).

The subtractor 146 may output a difference value between the respective outputs TRA and TER of the intra mode estimator 144 and the inter mode estimator 145. The reference value storage unit 147 may store a reference value REF configured on the outside of the video encoder 1. The comparator 149 may receive an output signal of the subtractor 146 and the reference value REF, may compare the output signal of the subtractor 146 and the reference value REF, and may output the selection signal SEL.

According to the exemplary embodiment illustrated in FIG. 10B, the decision unit 140b may compare compression efficiency when the macroblock 5 is configured as the intra macroblock and compression efficiency when the macroblock 5 is configured as the inter macroblock. The macroblock 5 in which a difference value between the two compression efficiencies is smaller than the reference value REF is configured as an intra macroblock so that the number of the encoded bits may be prevented from being increased when the macroblock 5 included in one region is configured as the intra macroblock.

The overflow counter 148 may receive the weight value WT_3 from the weight value storage unit 130 and may receive the selection signal SEL that is an output signal of the comparator 149. The overflow counter 148 may calculate the number of intra macroblocks to be included in the second region of the second frame 16 including the macroblock 5 currently input to the video encoder 1, in accordance with the received weight value WT_3. For example, the video encoder 1 may store the predetermined number Cf of intra macroblocks to be included in one frame. The overflow counter 148 may multiply the number Cf by the weight value WT_3 to calculate the number of intra macroblocks to be included in the second region.

The overflow counter 148 may receive the selection signal SEL and may output an enable signal EN in accordance with a value obtained by counting the number of times selection signal SEL being activated and the number of intra macroblocks to be included in the second region. For example, the overflow counter 148 may deactivate the enable signal EN when the value obtained by counting the selection signal SEL is larger than the number of intra macroblocks to be included in the second region. Thus, the comparator 149 may deactivate the selection signal SEL regardless of the signal output from the subtractor 146 and the reference value REF. For example, the overflow counter 148 may limit the number of intra macroblocks to be included in the second region to a number determined in accordance with the weight value WT_3.

Figure 11:
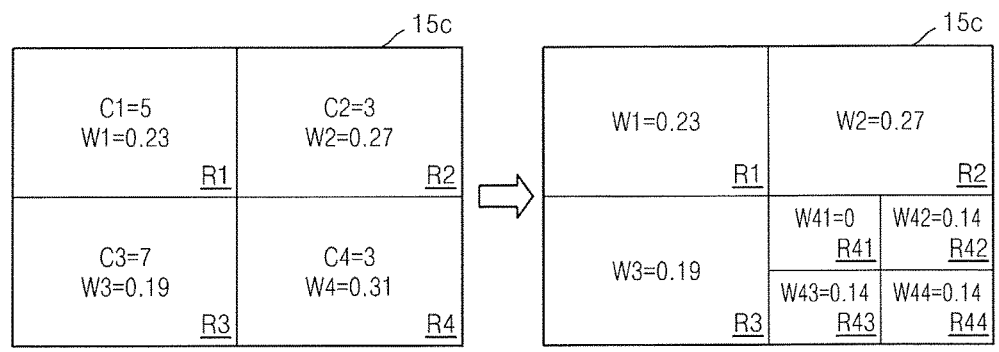
FIG. 11 is a view illustrating an operation of a frame dividing unit of a macroblock counting unit dividing a first frame according to an exemplary embodiment of the present inventive concept.

FIG. 11 is a view illustrating an operation of the frame dividing unit 112 of the macroblock counting unit 110 dividing a first frame 15c according to an exemplary embodiment of the present inventive concept. As illustrated in FIG. 6A, according to the exemplary embodiment of the present inventive concept, the frame dividing unit 112 may divide the first frame 15c into a plurality of regions through quadtree division. In addition, referring to FIG. 5, the frame dividing unit 112 may receive the weight value WT_2 from the weight value storage unit 130 and may divide the first frame 15c into the plurality of regions based on the received weight value WT_2. For example, the frame dividing unit 112 may compare a weight value corresponding to one of the plurality of regions with a predetermined value and may determine whether to further divide each of the plurality of regions in accordance with the comparison result.

If a certain region of the first frame 15c has a large weight value, the number of intra macroblocks included in the region may be relatively small. A region of the second frame 16, which corresponds to the region of the first frame 15c having the larger weight value than the other regions of the first frame, has more intra macroblocks than the other regions of the first frame. When a large number of intra macroblocks are configured in one region of the second frame 16, the intra macroblocks may be configured uniformly in the one region. Thus, the region of the first frame 15c having the large weight value may be divided into sub-regions and weight values of the sub-regions may be calculated.

As illustrated on the left of FIG. 11, the first frame 15c may be divided into the regions R1 to R4 corresponding to four quadrants thereof. The respective number values C1 to C4 and weight values W1 to W4 pertaining to the regions R1 to R4 are illustrated in FIG. 11. For example, the frame dividing unit 112 may divide a region having a weight value larger than 0.3 into sub-regions, and thus, the region R4 having a weight value W4 of 0.31 may be divided into the four sub-regions R41 to R44, as illustrated on the right of FIG. 11.

Figure 12:
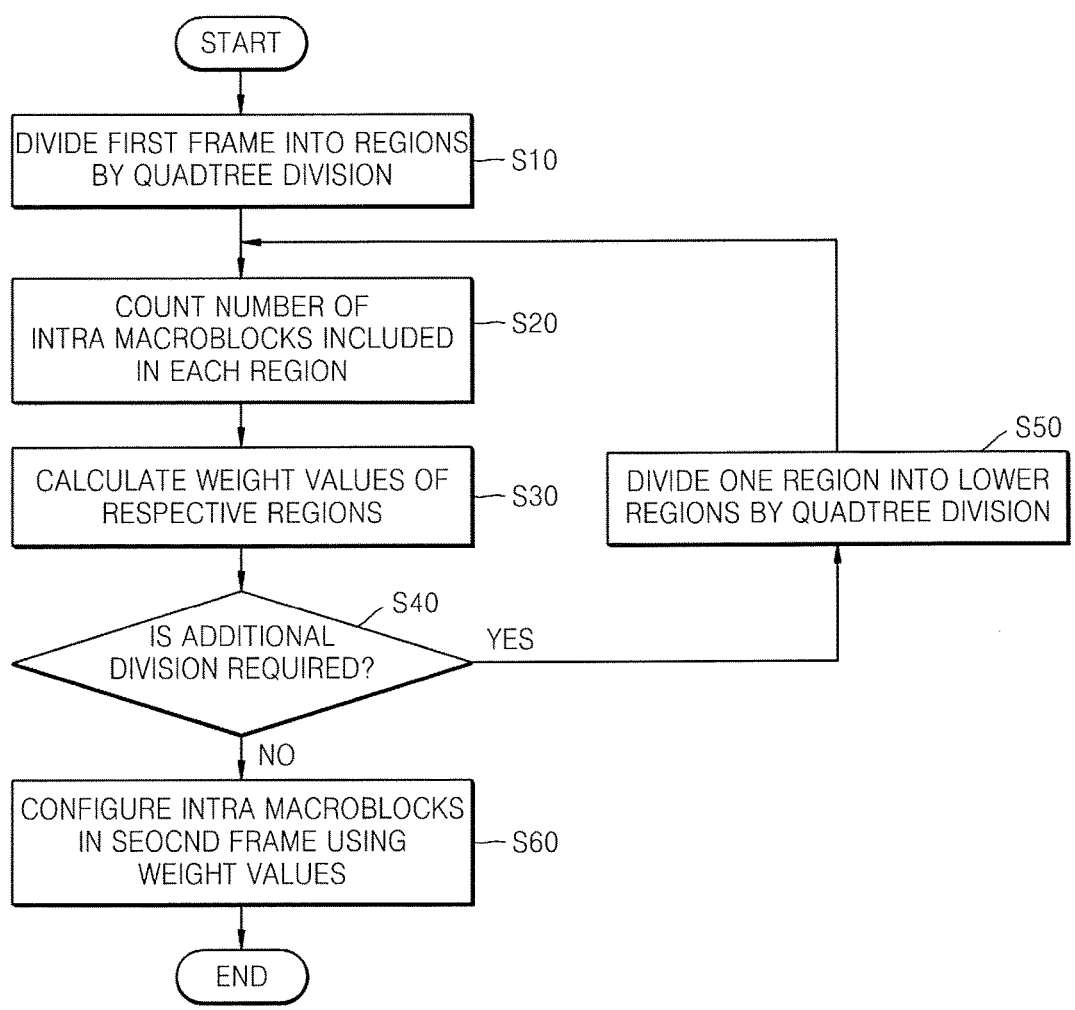
FIG. 12 is a flowchart illustrating an intra refresh method according to an exemplary embodiment of the present inventive concept.

FIG. 12 is a flowchart illustrating an intra refresh method according to an exemplary embodiment of the present inventive concept. The first frame 15 may be divided into a plurality of regions through quadtree division in operation S10. One region may be divided into four sub-regions and the four sub-regions may correspond to nodes of a quadtree. The plurality of regions of the first frame 15 may include intra macroblocks which are each configured in the intra mode for intra refresh, and the number of intra macroblocks included in each of the regions of the first frame 15 may be counted in operation S20.

Weight values of the respective regions of the first frame 15 may be calculated in operation S30. For example, a weight value of a region may be calculated based on the number of intra macroblocks included in the region and the number of intra macroblocks included in each of the neighboring regions of the region. When the weight values of the regions are calculated, it may be determined in operation S40 whether a certain region of the above regions divided from the first frame 15 is to be additionally divided into sub-regions. For example, when a weight value of a region is larger than a predetermined value, it may be determined that the region requires additional division into sub-regions. Thus, the region that requires additional division may be divided into the sub-regions through quadtree division in operation S50, and operations S20 and S30 for calculating weight values of the sub-regions may be performed.

When all the weight values of the regions are calculated and no region is determined to require additional division, intra macroblocks may be configured in the second frame 16 based on the weight values in operation S60. For example, the second frame 16 may be divided into regions having the same sizes and positions as those of the plurality of regions of the first frame 15 and the regions of the second frame 16 may include intra macroblocks configured based on the weight values of the corresponding regions of the first frame 15, respectively.

Figure 13A:
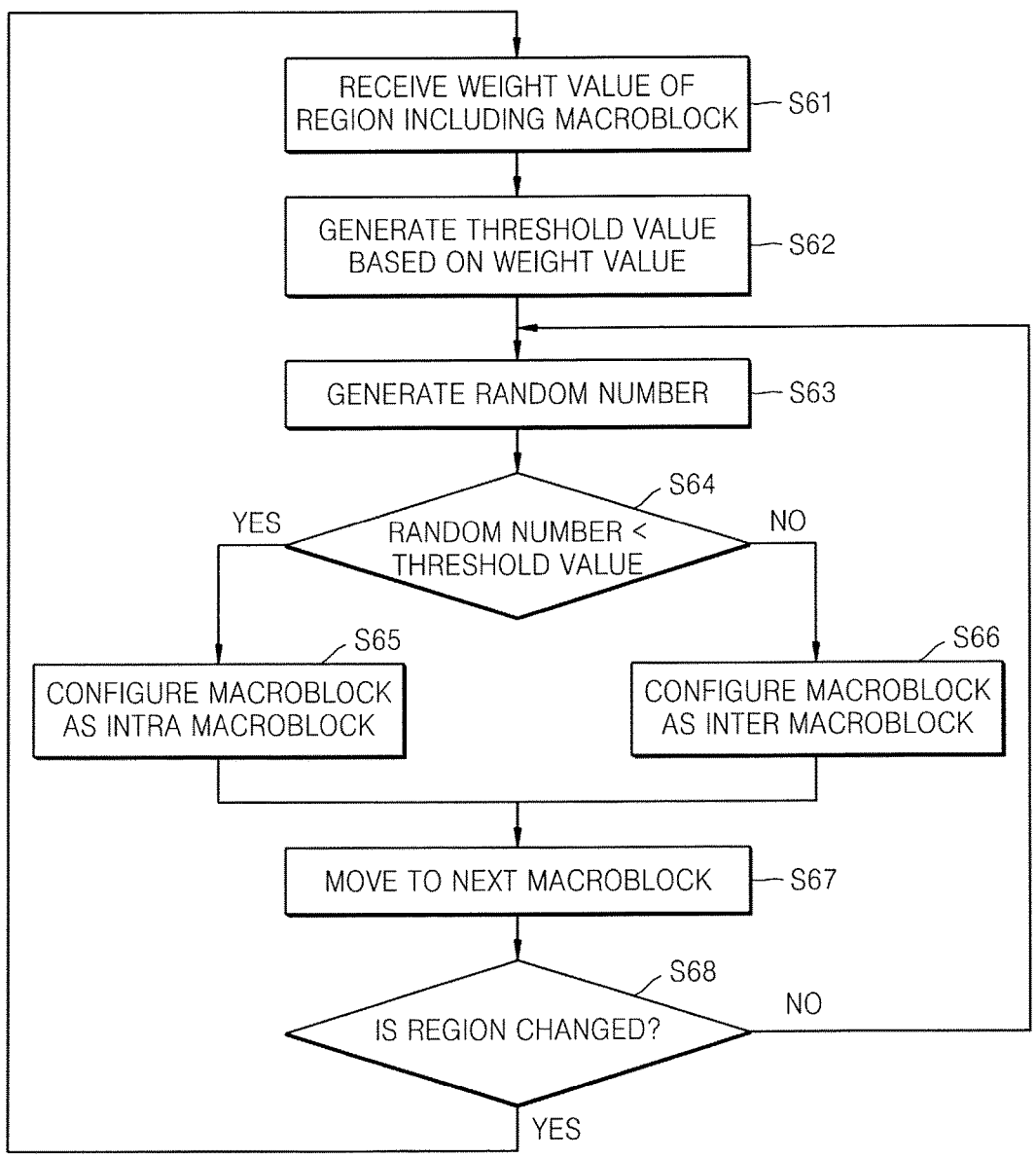
FIGS. 13A and 13B illustrate methods of configuring an intra macroblock in a second frame using a weight value according to exemplary embodiments of the present inventive concept.
Figure 13B:
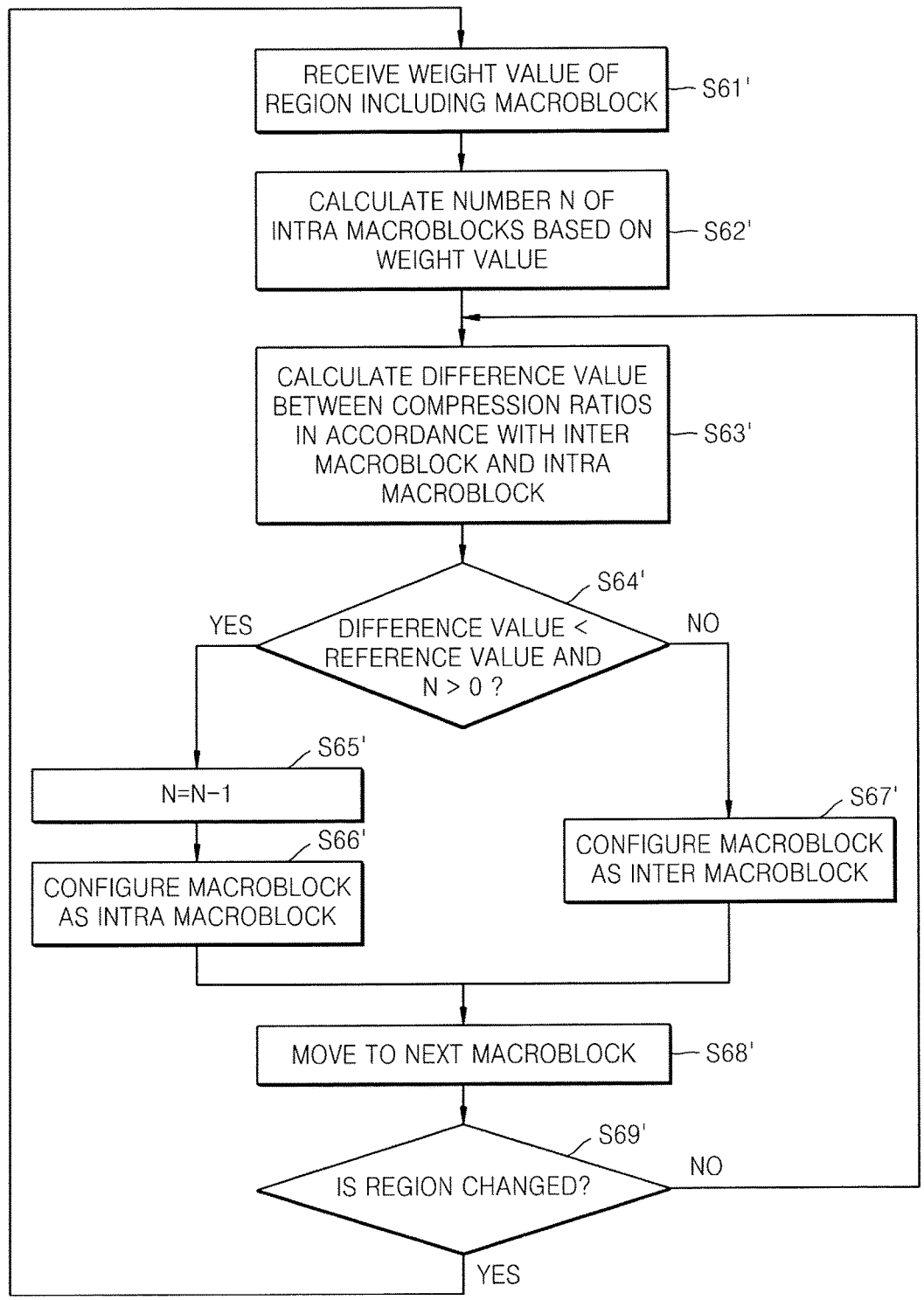

FIGS. 13A and 13B illustrate methods of configuring intra macroblocks in the second frame 16 using weight values according to exemplary embodiments of the present inventive concept. FIG. 13A illustrates a method of configuring intra macroblocks when it is performed by the decision unit 140a illustrated in FIG. 10A, and FIG. 13B illustrates a method of configuring intra macroblocks when it is performed by the decision unit 140b illustrated in FIG. 10B.

In the exemplary embodiment illustrated in FIG. 13A, the decision unit 140a may receive a weight value of a region of the first frame 15 corresponding to the region of the second frame 16 including the macroblock 5 in operation S61. The weight value is calculated based on the number of intra macroblocks included in the region of the first frame 15. According to the exemplary embodiment of the present inventive concept, the larger the weight value of the region of the first frame 15, the larger the number of intra macroblocks configured in the corresponding region of the second frame 16.

According to the exemplary embodiment of the present inventive concept, the decision unit 140a may include the threshold value generator 142, and the threshold value generator 142 may generate a threshold value in operation S62 based on the received weight value. For example, the threshold value generator 142 may generate the threshold value based on the received weight value, a predetermined number of intra macroblocks to be included in the second frame 16, and a range of a random number.

According to the exemplary embodiment of the present inventive concept, the decision unit 140a may include the random number generator 141 and the comparator 143. The random number generator 141 may generate a random number RN within a range in operation S63, and the comparator 143 may compare the random number RN generated by the random number generator 141 and the threshold value TN generated by the threshold value generator 142 in operation S64. For example, the comparator 143 may determine whether the random number RN is smaller than the threshold value TN. When the random number is smaller than the threshold value, the macroblock 5 may be configured as an intra macroblock in operation S65. When the random number is not smaller than the threshold value, the macroblock 5 may be configured as an inter macroblock in operation S66.

The video encoder 1 may receive a next macroblock of the second frame 16 in operation S67 and may determine in operation S68 whether a region including the next macroblock is different from a region including a previous macroblock. When the two regions are different, a weight value of a region of the first frame 15 corresponding to the region of the second frame 16 including the next macroblock may be received in operation S61. On the other hand, when the two regions are the same as each other, the random number generator 141 may generate a new random number in operation S63, since the previously received weight value is reusable.

Referring to FIG. 13B, the decision unit 140b may receive a weight value of a region of the first frame 15 corresponding to the second region of the second frame 16 including the macroblock 5 in operation S61'. The overflow counter 148 included in the decision unit 140b may calculate the number N of intra macroblocks to be included in the second region based on the received weight value in operation S62'

Referring back to FIG. 10B, the intra mode estimator 144 and the inter mode estimator 145 may generate signals dependent on compression ratios of the macroblock 5 currently input to the video encoder 1. The compression ratios of the macroblock 5 may be obtained when the macroblock 5 is configured as the intra macroblock and the inter macroblock, respectively. The subtractor 146 may calculate a difference value in accordance with the generated signals in operation S63'. The comparator 149 may compare the difference value and the reference value REF stored in the reference value storage unit 147. In addition, the overflow counter 148 may deactivate the enable signal EN and thus, may deactivate the comparator 149, in accordance with the number of macroblocks configured as intra macroblocks and the number of intra macroblocks to be included in the second region in operation S64'. For example, the overflow counter 148 may be a down counter that starts from the number N of intra macroblocks to be included in the second region.

When the difference value is smaller than the reference value REF and there are the intra macroblocks to be included in the second region, the macroblock 5 is configured as an intra macroblock and the overflow counter 148 may reduce the number of intra macroblocks to be included in the second region by one in operation S65'. The comparator 149 may output the selection signal SEL to configure the macroblock 5 as an intra macroblock. On the other hand, when the difference value is equal to or greater than the reference value REF, or the number of left intra macroblocks to be included in the second region is 0, the comparator 149 may output the selection signal SEL to configure the macroblock 5 as an inter macroblock in accordance with the output signal of the subtractor 146, the reference value REF, and the enable signal EN of the overflow counter 148.

Figure 14:
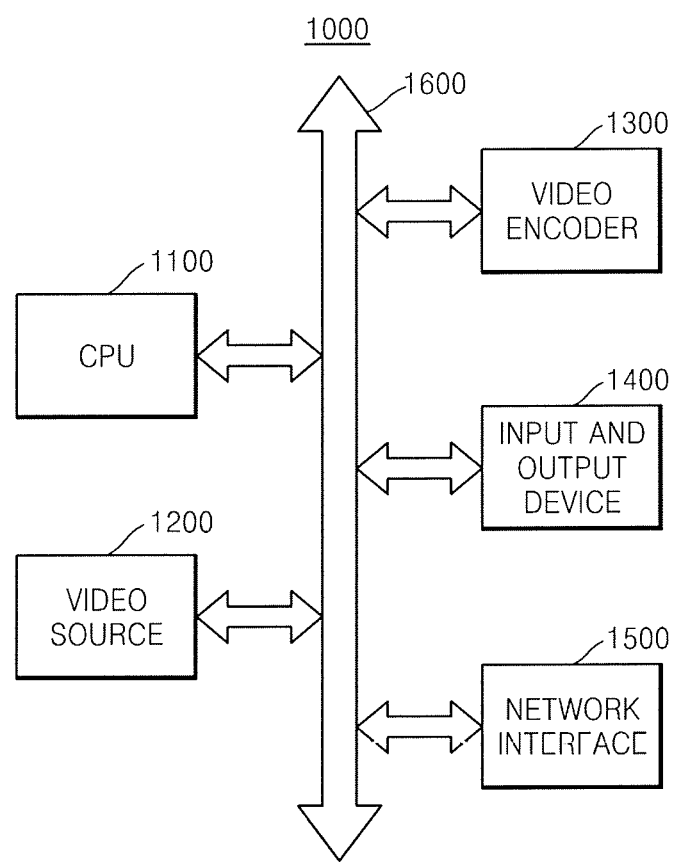
FIG. 14 is a block diagram illustrating a computing system including a video encoder according to an exemplary embodiment of the present inventive concept.

The video encoder 1 may receive a next macroblock of the second frame 16 in operation S68' and may determine whether a region including the next macroblock is different from a region including a previous macroblock in operation S69'. When the region including the next macroblock is different from the region including a previous macroblock, a weight value of a region of the first frame 15 corresponding to the region including the next macroblock may be received in operation S61'. When the two regions are not different, a difference value between two compression ratios (e.g., a compression ratio according to the intra mode and a compression ratio according to the inter mode) of the next macroblock may be calculated in operation S63', since the previously received weight value is reusable. FIG. 14 is a block diagram illustrating a computing system 1000 including a video encoder 1300 according to an exemplary embodiment of the present inventive concept. The video encoder 1300 of the present inventive concept may be mounted in the computing system 1000 such as a mobile device or a desktop computer. The computing system 1000 according to the exemplary embodiment of the present inventive concept may include a central processing unit (CPU) 1100, a video source 1200, a video encoder 1300, an input and output device 1400, and a network interface 1500. The central processing unit (CPU) 1100, the video source 1200, the video encoder 1300, the input and output device 1400, and the network interface 1500 may be electrically connected to a bus 1600, respectively.

The CPU 1100 may control the computing system 1000 and may perform an operation corresponding to a command of a user input through the input and output device 1400. The video source 1200 that operates as a video capture device may include, for example, a video camera, a video contents supply device, a camera phone, a video phone, or a mobile phone mounted with a camera.

The video encoder 1300 may receive a video signal supplied by the video source 1200 through the bus 1600. The video signal may include a frame sequence including a plurality of frames. The video encoder 1300 may encode the video signal in units of frames and may output an encoded bit stream through the bus 1600. The frame may include a plurality of macroblocks. The video encoder 1300 may perform an intra refresh. The video encoder 1300 may configure some of the macroblocks included in the frame as intra macroblocks for the intra refresh. For example, the video encoder 1300 may divide the first frame 15 into a plurality of regions and may calculate the weight values of each of the plurality of regions based on the number of intra macroblocks included in each of the plurality of regions. The video encoder 1300 may configure macroblocks included in the second frame 16 as intra macroblocks based on the calculated weight values.

The input and output device 1400 may receive a command from the outside of the computing system 1000 to transmit the received command to another element through the bus 1600 or may output a moving picture to the outside of the computing system 1000 in accordance with data received through the bus 1600. The network interface 1500 may transmit the data received through a network to another element through the bus 1600 or may output the data received through the bus 1600 to the outside through the network. For example, the network interface 1500 may receive the encoded bit stream output by the video encoder 1300 through the bus 1600 or may transmit the received bit stream to a destination device through a wired or wireless communication channel.

Figure 15:
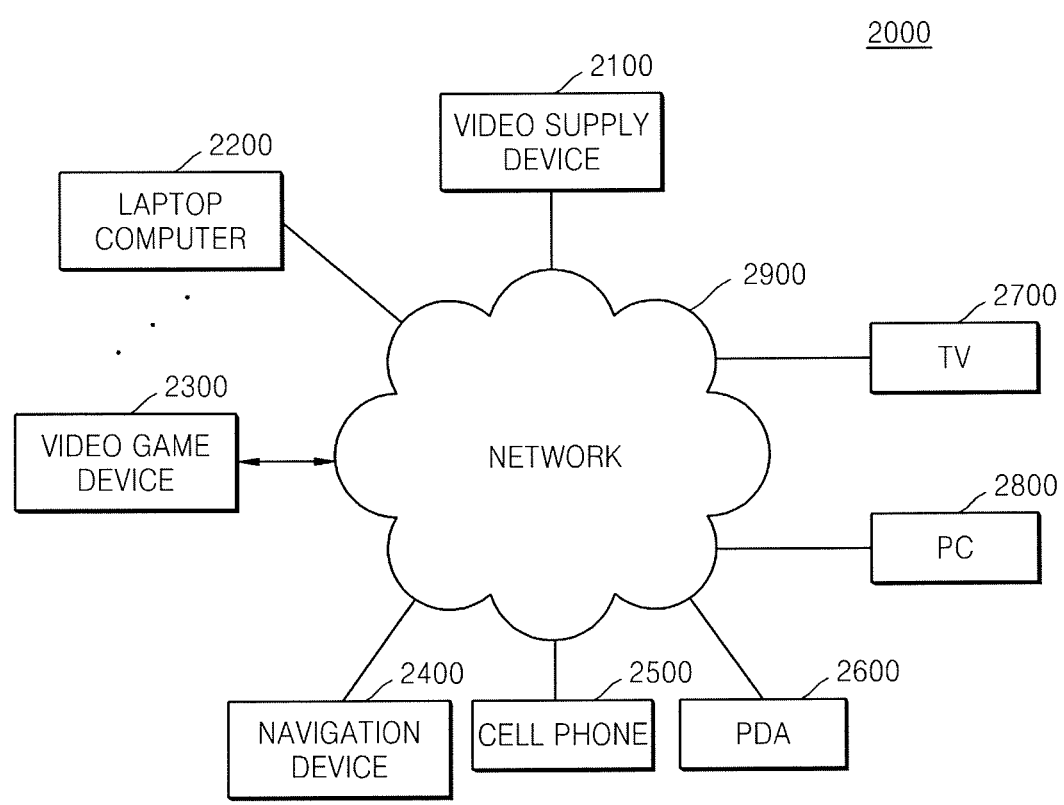
FIG. 15 is a block diagram illustrating an implementation example of a video service system according to an exemplary embodiment of the present inventive concept.

FIG. 15 is a block diagram illustrating an implementation example of a video service system according to an exemplary embodiment of the present inventive concept. As illustrated in FIG. 15, a video service system 2000 may include a video supply device 2100, a network 2900, and a plurality of destination devices 2200 to 2800 connected to the network 2900. The network 2900 may be implemented by a wired or wireless communication network. The video supply device 2100 may include a video encoder according to one of the exemplary embodiments of the present inventive concept, for example, the computing system 1000 of FIG. 14.

The destination devices 2200 to 2800 may include a laptop computer 2200, a video game device 2300, a navigation device 2400, a mobile phone 2500, a personal digital assistant (PDA) 2600, a television (TV) 2700, and a personal computer (PC) 2800. The destination devices may include various devices including a decoder that receives and decodes the encoded bit stream. However, embodiments of the present inventive concept are not limited to the above devices.

While the present inventive concept has been particularly shown and described with reference to exemplary embodiments thereof, it will be understood that various changes in form and details may be made therein without departing from the spirit and scope of the following claims.

What is claimed is:
1. An intra refresh method for video encoding by generating an encoded bit stream from a video frame sequence, comprising:
    dividing a first frame of the video frame sequence into a plurality of regions, using a video encoder;
    counting a number of intra macroblocks included in each of the plurality of regions, using the video encoder;
    calculating a weight value of a first region among the plurality of regions using the number of intra macroblocks included in at least one of the plurality of regions, using the video encoder;
    receiving a macroblock included in a second region of a second frame, wherein the second frame is included in the video frame sequence, using the video encoder;
    configuring the macroblock included in the second region as an intra macroblock, using the weight value of the first region, using the video encoder, wherein the second region corresponds to the first region; and
    generating the encoded bit stream using the configured macroblock, using the video encoder.

2. The intra refresh method of claim 1, wherein the first frame is divided by repetitive quadtree division such that the first region corresponds to one of nodes of a quadtree of the first frame.

3. The intra refresh method of claim 2, wherein the first region is divided into sub-regions in accordance with the weight value of the first region.

4. The intra refresh method of claim 2, wherein the weight value of the first region is determined by the following equation:

$$Wc1=\{1-C1/(C1+C2+C3+\ldots+Cn)\}/(n-1),$$

where 'Wc1' is the weight value of the first region, 'C1' is a number of intra macroblocks included in the first region, 'n' is a number of the plurality of regions, and each of 'C2', 'C3,' and 'Cn' is a number of intra macroblocks included a corresponding one among the plurality of regions excluding the first region.

5. The intra refresh method of claim 2, further comprising storing the weight value of the first region in a weight value storage unit included in a video encoder as a quadtree data structure.

6. The intra refresh method of claim 1, further comprising:
generating a random number; and
generating a threshold value using the weight value of the first region,
wherein macroblocks included in the second region are configured as intra macroblocks using a result of comparing the threshold value and the random number.

7. The intra refresh method of claim 6, wherein the threshold value is determined using the weight value of the first region, a predetermined number of intra macroblocks in the second frame, and a range of the random number.

8. The intra refresh method of claim 7, wherein the macroblocks included in the second region are configured as intra macroblocks when the generated random number is smaller than the threshold value.

9. The intra refresh method of claim 1, wherein a size and a position of the first region are equal to a size and a position of the second region.

10. The intra refresh method of claim 1, wherein the second frame is a next frame of the first frame.

11. The intra refresh method of claim 10, further comprising determining whether the second frame is a starting frame, wherein the weight value of the first region is determined to be in proportion to a size of the first region when the second frame is determined as the starting frame.

12. The infra refresh method of claim 1, wherein each region in the plurality of regions is equal in size.

13. An intra refresh method for video encoding by generating an encoded bit stream from a video frame sequence, comprising:
dividing a first frame of the video frame sequence into a plurality of regions, using a video encoder;
counting a number of intra macroblocks included in each of the plurality of regions, using the video encoder;
calculating a weight value of a first region among the plurality of regions using the number of intra macroblocks included in at least one of the plurality of regions, using the video encoder;
calculating a number of intra macroblocks to be included in a second region of a second frame using the weight value of the first region, wherein the second region corresponds to the first region, wherein the second frame is included in the video frame sequence, using the video encoder;
receiving a macroblock included in the second region, using the video encoder;
configuring the macroblock included in the second region as an intra macroblock, using the calculated number of intra macroblocks to be included in the second region, using the video encoder; and
generating the encoded bit stream using the configured macroblock, using the video encoder.

14. The intra refresh method of claim 13, wherein the configuring of the macroblocks comprises:
estimating compression ratios when the macroblocks are configured as inter macroblocks and when the macroblocks are configured as intra macroblocks; and
configuring the macroblocks as the intra macroblocks using the number of intra macroblocks to be included in the second region and a result of comparing a difference value between the estimated compression ratios with a reference value.

15. The intra refresh method of claim 14, further comprising configuring the reference value using a signal received from outside of a video encoder.

16. A video encoder for generating an encoded bit stream from a video frame sequence, comprising:
a macroblock counting unit configured to count a number of intra macroblocks in a first region among a plurality of regions divided from a first frame of the video frame sequence, using the video encoder; and
a decision unit configured to determine whether to configure a macroblock included in a second region of a second frame of the video frame sequence as an intra macroblock, using a weight value of the first region, using the video encoder, the weight value being calculated using the counted number, wherein the second region corresponds to the first region,
wherein the second frame is included in the video frame sequence, and
wherein the video encoder is configured to receive the macroblock included in the second region and
generate the encoded bit stream using the configured macroblock.

17. The video encoder of claim 16, further comprising:
a weight value calculating unit configured to receive the counted number output from the macroblock counting unit and to generate the weight value of the first region; and
a weight value storage unit configured to store the weight value.

18. The video encoder of claim 16, wherein the macroblock counting unit determines whether to further divide the first region using the weight value.

19. The video encoder of claim 16, wherein the decision unit comprising:
a random number generator configured to generate a random number within a range;
a threshold value generator configured to generate a threshold value using the weight value;
and a comparator configured to compare the threshold value and the random number and to output a selection signal using the comparison result between the threshold value and the random number.

20. The video encoder of claim 19, wherein the threshold value is determined using the weight value, a predetermined number of intra macroblocks in the second frame, and the range of the random number.

* * * * *